United States Patent
Jin et al.

(10) Patent No.: US 11,923,772 B2
(45) Date of Patent: Mar. 5, 2024

(54) DC/DC CONVERTER FOR DECREASING POWER LOSS CAUSED PARASITIC RESISTANCE AND INCREASING EQUIVALENT CAPACITANCE OF HIGH-VOLTAGE SIDE CAPACITOR

(71) Applicant: Delta Electronics, Inc., Taoyuan (TW)

(72) Inventors: Da Jin, Taoyuan (TW); Zhengyu Ye, Taoyuan (TW); Xueliang Chang, Taoyuan (TW); Shengli Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 339 days.

(21) Appl. No.: 17/361,568

(22) Filed: Jun. 29, 2021

(65) Prior Publication Data

US 2022/0006380 A1    Jan. 6, 2022

(30) Foreign Application Priority Data

Jul. 6, 2020  (CN) .......................... 202010640794.3

(51) Int. Cl.
*H02M 3/158*    (2006.01)
*H02M 1/00*    (2006.01)

(52) U.S. Cl.
CPC ......... *H02M 3/158* (2013.01); *H02M 1/0048* (2021.05)

(58) Field of Classification Search
CPC ...... H02M 3/158; H02M 3/01; H02M 3/3353; H02M 1/0048; H02M 1/0045; H02M 1/126; H02M 1/14; H02M 5/293; Y02B 70/10
See application file for complete search history.

(56) References Cited

U.S. PATENT DOCUMENTS

| | | | |
|---|---|---|---|
| 7,466,170 B2 * | 12/2008 | Balakrishnan | H03K 17/0822 327/423 |
| 8,350,540 B2 * | 1/2013 | Cuk | H02M 3/155 323/224 |
| 11,088,611 B2 | 8/2021 | Jin et al. | |
| 11,329,569 B2 | 5/2022 | Jin et al. | |

(Continued)

FOREIGN PATENT DOCUMENTS

| CN | 207691701 U | 8/2018 |
|---|---|---|
| CN | 105934876 B | 4/2019 |

(Continued)

*Primary Examiner* — Emily P Pham
(74) *Attorney, Agent, or Firm* — KIRTON McCONKIE; Evan R. Witt

(57) ABSTRACT

A DC/DC converter includes a high-voltage side, a low-voltage side, a high-voltage side capacitor and a power conversion circuit. The high-voltage side includes a high-voltage positive terminal and a high-voltage negative terminal. The low-voltage side includes a low-voltage positive terminal and a low-voltage negative terminal. The low-voltage negative terminal is electrically connected with the high-voltage negative terminal A first terminal of the high-voltage side capacitor is electrically connected with the high-voltage positive terminal. A second terminal of the high-voltage side capacitor is electrically connected with the low-voltage positive terminal. The power conversion circuit is electrically connected between the high-voltage side and the low-voltage side. The power conversion circuit includes at least one switch and at least one magnetic assembly.

18 Claims, 8 Drawing Sheets

(56) References Cited

U.S. PATENT DOCUMENTS

| | | | |
|---|---|---|---|
| 11,469,674 B2 | 10/2022 | Jin et al. | |
| 2010/0061122 A1* | 3/2010 | Okubo | H02M 3/158 363/20 |
| 2012/0001612 A1* | 1/2012 | Cuk | H02M 3/005 323/311 |
| 2016/0329811 A1* | 11/2016 | Du | H02M 1/14 |
| 2020/0153335 A1 | 5/2020 | Na et al. | |

FOREIGN PATENT DOCUMENTS

| | | |
|---|---|---|
| CN | 107437885 B | 2/2020 |
| CN | 109565240 B | 2/2021 |
| JP | H1140425 A | 2/1999 |

* cited by examiner

DC/DC CONVERTER FOR DECREASING POWER LOSS CAUSED PARASITIC RESISTANCE AND INCREASING EQUIVALENT CAPACITANCE OF HIGH-VOLTAGE SIDE CAPACITOR

CROSS-REFERENCE TO RELATED APPLICATION

This application claims priority to China Patent Application No. 202010640794.3, filed on Jul. 6, 2020, the entire contents of which are incorporated herein by reference for all purposes.

FIELD OF THE INVENTION

The present disclosure relates to a converter, and more particularly to a DC/DC converter.

BACKGROUND OF THE INVENTION

For achieving the high current through the non-isolated circuitry structure, the DC/DC converter usually uses a resonant circuit topology with an extensible duty cycle. Further, such DC/DC converters are usually divided into a symmetrical converter and an asymmetrical converter.

Regardless of the type of the DC/DC converter, the conventional DC/DC converter usually includes a plurality of switches. The plurality of switches may be divided into two groups. The phase difference between the conducting state of the switches in the first group and the conducting state of the switches in the second group is 180 degrees. In addition, the conventional DC/DC converter further includes a magnetic assembly and two capacitors. One of the two capacitors is connected across the input terminals of the DC/DC converter and used as a high-voltage side capacitor. The other of the two capacitors is connected across the output terminals of the DC/DC converter and used as a low-voltage side capacitor.

However, while the plurality of switches of the conventional DC/DC converter are in the conducting states at the phase difference of 180 degrees, a plurality of AC current loops are generated by the magnetic assembly and the conducting-state switches and associated electronic components collaboratively. Since the AC current in at least one of the plurality of AC current loops flows through both the high-voltage side capacitor and the low-voltage side capacitor, an equivalent series resistance (ESR) formed by the high-voltage side capacitor and low-voltage side capacitor will result in a high power loss.

Moreover, due to the space limitation, the high-voltage side capacitor of the conventional DC/DC converter usually uses multi-layer ceramic capacitors (MLCC). Generally, as the DC voltage across the two terminals of such capacitor increases, the equivalent capacitance of the multi-layer ceramic capacitor decreases. Consequently, if the DC voltage across the two terminals of the high-voltage side capacitor is higher, the DC voltage offset of the high-voltage side capacitor is higher, and the equivalent capacitance of high-voltage side capacitor is lower.

Therefore, there is a need of providing an improved DC/DC converter in order to overcome the drawbacks of the conventional technologies.

SUMMARY OF THE INVENTION

An object of the present disclosure provides a DC/DC converter. The circuitry structure of the DC/DC converter is specially designed. Since the number of capacitors for the AC current to flow through is reduced, the power loss caused by the parasitic resistance is reduced and the DC voltage offset of the high-voltage side capacitor is decreased. Consequently, the equivalent capacitance of the high-voltage side capacitor is increased.

In accordance with an aspect of the present disclosure, a DC/DC converter is provided. The DC/DC converter includes a first end, a second end, a first capacitor and a power conversion circuit. The first end includes a high-voltage positive terminal and a high-voltage negative terminal. The second end includes a low-voltage positive terminal and a low-voltage negative terminal. The low-voltage negative terminal is electrically connected with the high-voltage negative terminal A first terminal of the first capacitor is electrically connected with the high-voltage positive terminal A second terminal of the first capacitor is electrically connected with the low-voltage positive terminal. The power conversion circuit is disposed between the first end and the second end and provides a conversion between a high voltage at the first end and a low voltage at the second end. The power conversion circuit includes at least one switch and at least one magnetic assembly.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
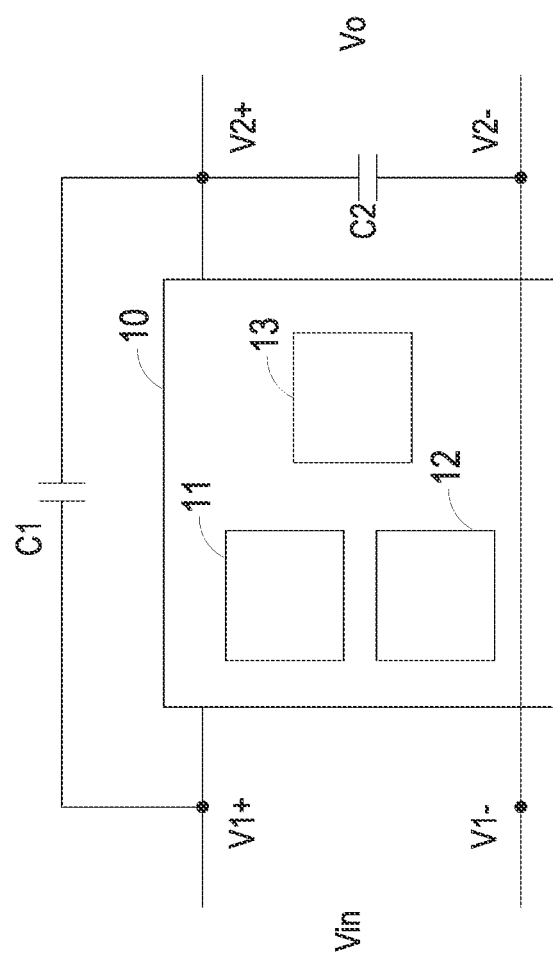
FIG. 1 is a schematic circuit diagram of a DC/DC converter according to the present disclosure.

FIG. 1 is a schematic circuit diagram of a DC/DC converter according to the present disclosure. The DC/DC converter 1 receives an input voltage Vin and converts the input voltage Vin into an output voltage Vo.

The DC/DC converter 1 includes a high-voltage side (or referred to as a first end), a low-voltage side (or referred to as a second end), a high-voltage side capacitor C1 (or referred to as a first capacitor), a low-voltage side capacitor C2 (or referred to as a second capacitor) and a power conversion circuit 10. The high-voltage side includes a high-voltage positive terminal V1+ and a high-voltage negative terminal V1−. The DC/DC converter 1 receives the input voltage Vin through the high-voltage positive terminal V1+ and the high-voltage negative terminal V1−. The low-voltage side includes a low-voltage positive terminal V2+ and a low-voltage negative terminal V2−. The DC/DC converter 1 outputs the output voltage Vo through the low-voltage positive terminal V2+ and the low-voltage negative terminal V2−. Further, the low-voltage negative terminal V2− is electrically connected with the high-voltage negative terminal V1−. Consequently, the DC/DC converter 1 is a non-isolated DC/DC converter.

The first terminal of the high-voltage side capacitor C1 is electrically connected with the high-voltage positive terminal V1+. The second terminal of the high-voltage side capacitor C1 is electrically connected with the low-voltage positive terminal V2+. The first terminal of the low-voltage side capacitor C2 is electrically connected with the low-voltage positive terminal V2+. The second terminal of the low-voltage side capacitor C2 is electrically connected with the low-voltage negative terminal V2−. The high-voltage side capacitor C1 and the low-voltage side capacitor C2 are connected in series to filter off the voltage ripple at the high-voltage side. The low-voltage side capacitor C2 is used for filtering off the voltage ripple at the low-voltage side. Preferably but not exclusively, the high-voltage side capacitor C1 is a multi-layer ceramic capacitor (MLCC).

The power conversion circuit 10 is electrically connected between the high-voltage side and the low-voltage side and provides a conversion between a high voltage at the high-voltage side and a low voltage at the low-voltage side. The power conversion circuit 10 includes a first switch group 11, a second switch group 12 and at least one magnetic assembly 13. The first switch group 11 and the second switch group 12 are electrically connected with the high-voltage positive terminal V1+ and the high-voltage negative terminal V1−, respectively. The first switch group 11 includes at least one switch. The second switch group 12 includes at least one switch. The phase difference between the conducting time of the at least one switch of the first switch group 11 and the conducting time of the at least one switch of the second switch group 12 is 180 degrees. The magnetic assembly 13 includes a transformer, an inductor or a combination of the transformer and the inductor. The magnetic assembly 13 is electrically connected with the first switch group 11 and the second switch group 12. By use of the switching operation of the first switch group 11 and the second switch group 12 together with the magnetic assembly 13, the power conversion circuit 10 converts the input voltage Vin into the output voltage Vo.

In some embodiments, the power conversion circuit 10 may use a resonant type circuit topology with an extensible duty cycle. Moreover, when the power conversion circuit 10 employs the resonant topology with an extensible duty cycle, the power conversion circuit 10 may be divided into a symmetric circuitry structure or an asymmetric circuitry structure.

As above mentioned, the first terminal of the high-voltage side capacitor C1 is electrically connected with the high-voltage positive terminal V1+, and the second terminal of the high-voltage side capacitor C1 is electrically connected with the low-voltage positive terminal V2+. Consequently, the paths of the plurality of AC current loops in DC/DC converter 1 are changed. In this way, the AC current in each AC current loop only flows through one of the high-voltage side capacitor C1 and the low-voltage side capacitor C2. The AC current in the AC current loop flows through reduced number of capacitors and the path of the AC current loop is shortened, and the power loss caused by the parasitic resistance is decreased. As previously described, since the high-voltage side capacitor of the conventional DC/DC converter is electrically connected across the high-voltage positive terminal and high-voltage negative terminal, the voltage across the two terminals of the high-voltage side capacitor is equal to the input voltage. In accordance with the present disclosure, the DC voltage across the two terminals of the high-voltage side capacitor C1 of the DC/DC converter 1 is equal to the difference between the input voltage Vin and the output voltage Vo. That is, the DC voltage across the two terminals of the high-voltage side capacitor C1 is equal to Vin-Vo. Therefore, the DC voltage across the two terminals of the high-voltage side capacitor C1 is lower than the input voltage Vin. Consequently, the DC voltage offset of the high-voltage side capacitor C1 is decreased. In other words, the capacitor with a higher equivalent capacitance can be selected as the high-voltage side capacitor C1. In this embodiment, the voltage ripple at the high-voltage side is filtered off by the series-connected high-voltage side capacitor C1 and low-voltage side capacitor C2. The voltage ripple at the low-voltage side is filtered off by the low-voltage side capacitor C2.

Some examples of the DC/DC converter 1 will be described as follows. Especially, the concept of the DC/DC converter 1 can be applied to all kinds of non-isolated DC/DC converters.

Figure 2A:
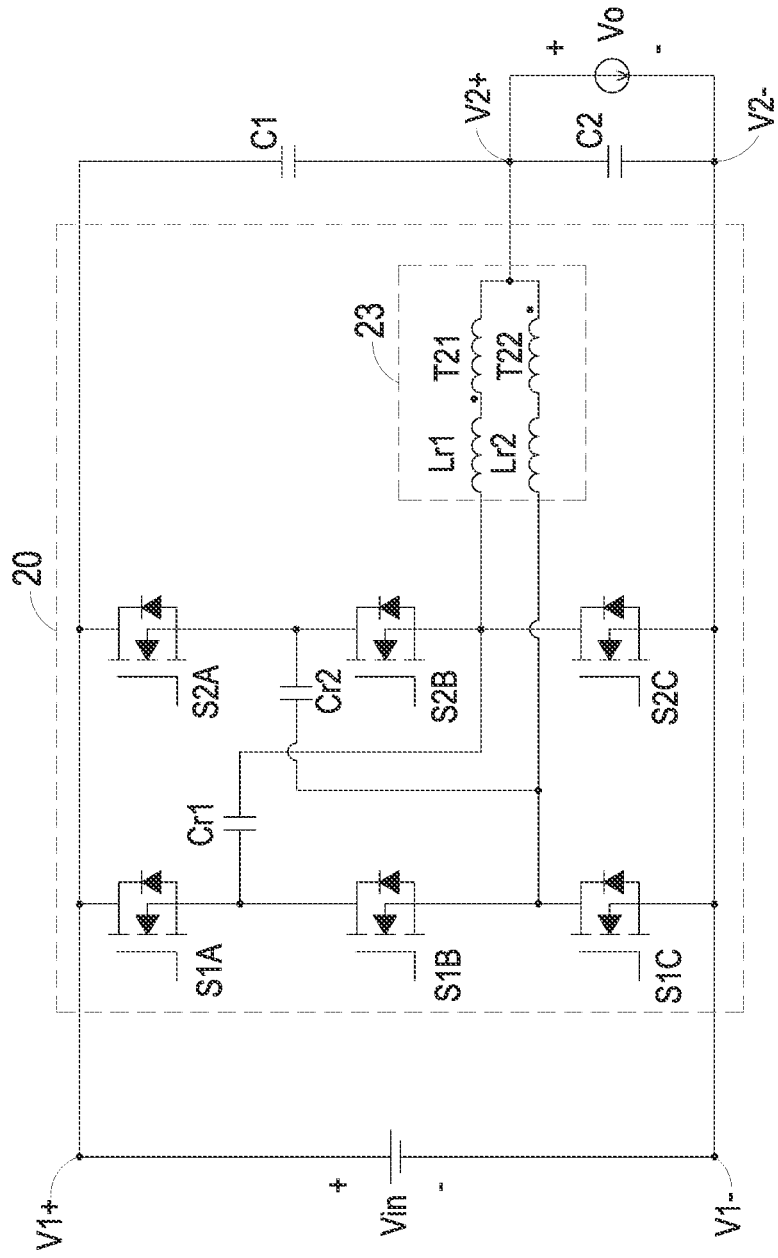
FIG. 2A is a circuit structure of a DC/DC converter according to a first embodiment of the present disclosure.
Figure 2B:
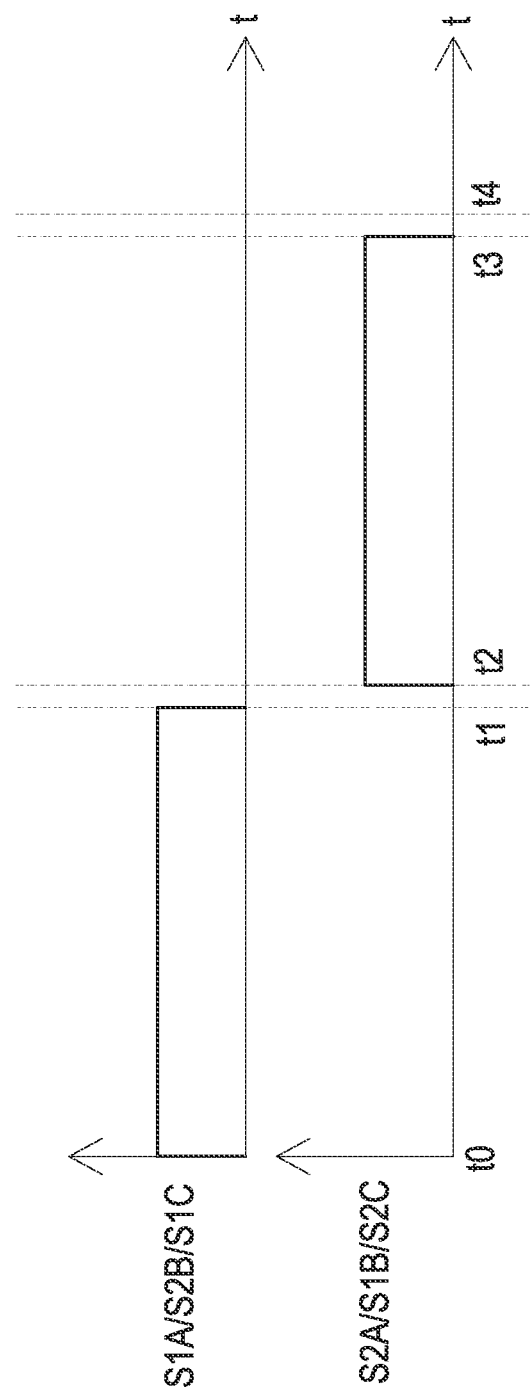
FIG. 2B is a schematic timing waveform diagram illustrating the time sequence of operating associated switches of the power conversion circuit of the DC/DC converter as shown in FIG. 2A.
Figure 2C:
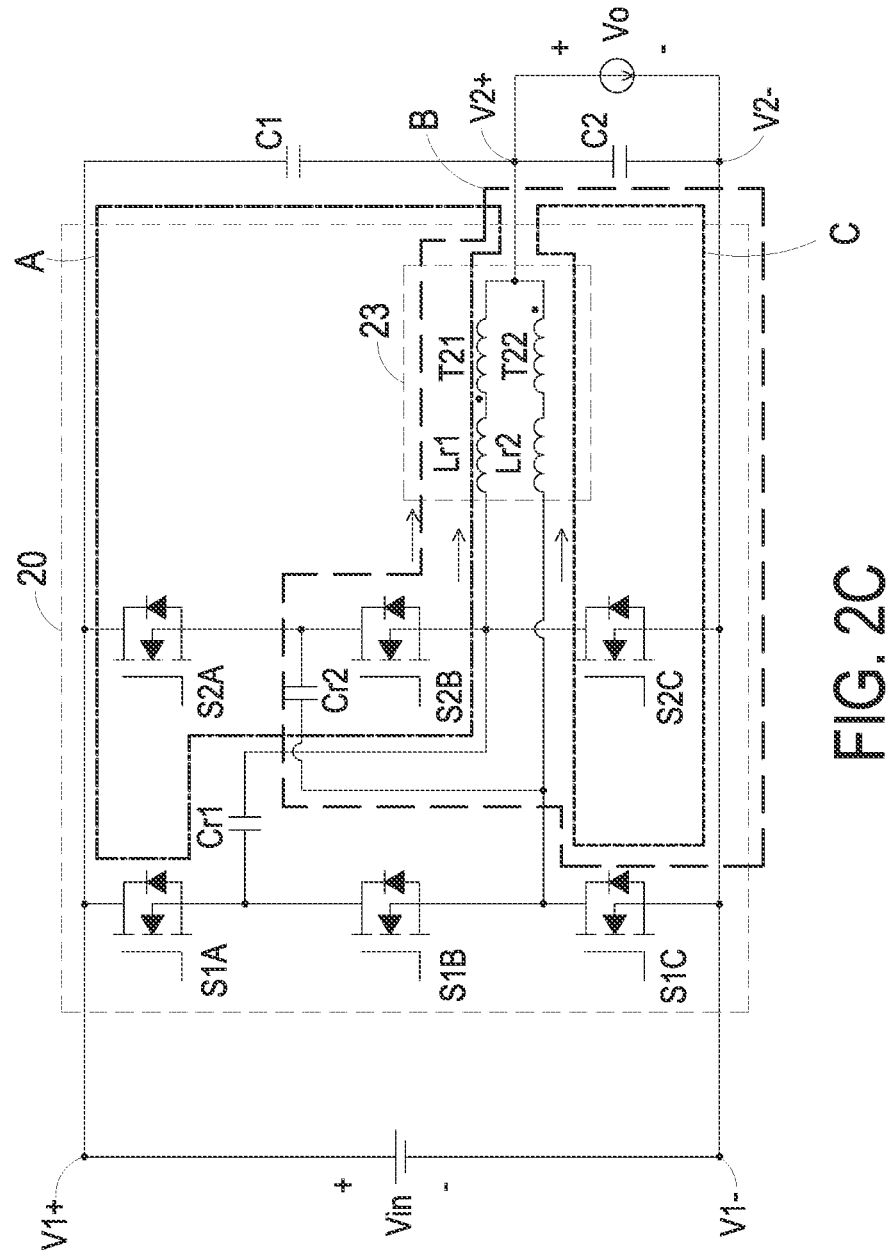
FIG. 2C is a schematic circuit diagram illustrating the AC current loops of the power conversion circuit of the DC/DC converter as shown in FIG. 2A in the time interval between the time point t0 and the time point t1.
Figure 2D:
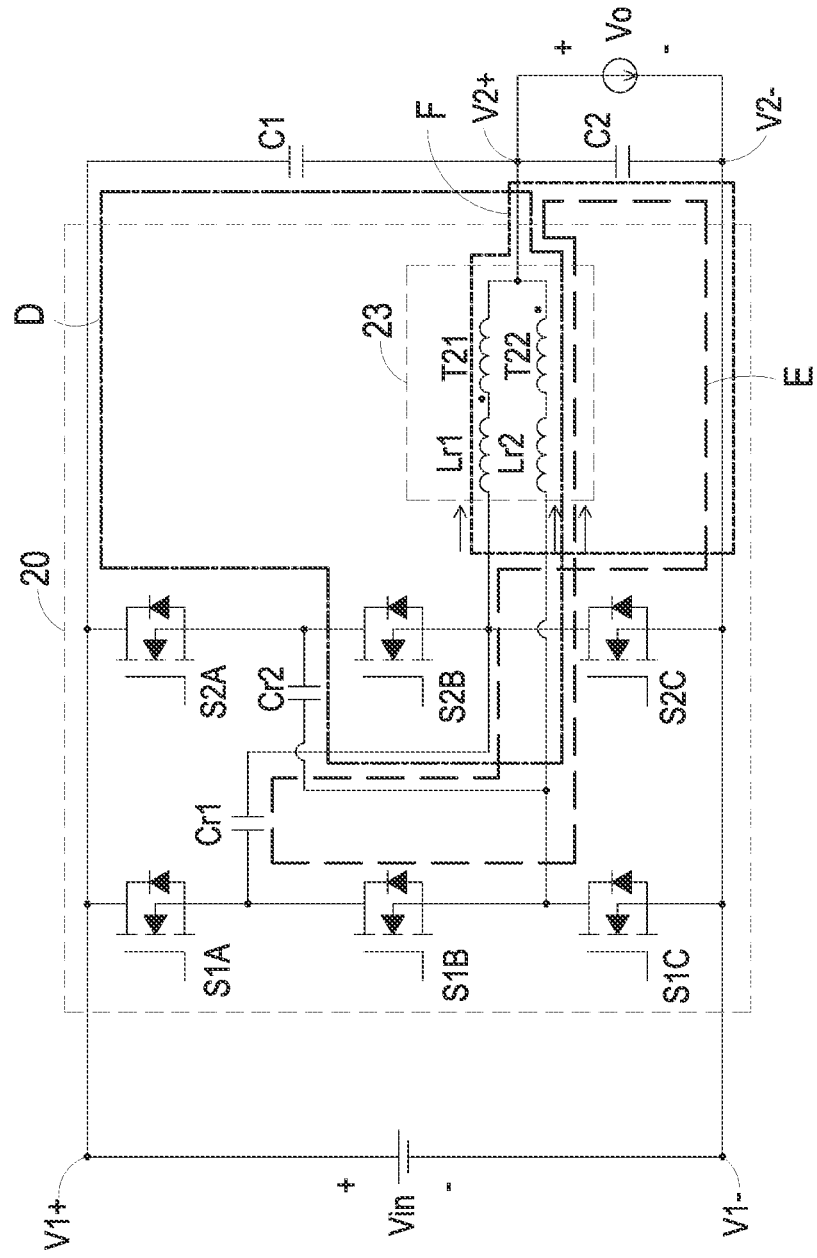
FIG. 2D is a schematic circuit diagram illustrating the AC current loops of the power conversion circuit of the DC/DC converter as shown in FIG. 2A in the time interval between the time point t2 and the time point t3.

FIG. 2A is a circuit structure of a DC/DC converter according to a first embodiment of the present disclosure. FIG. 2B is a schematic timing waveform diagram illustrating the time sequence of operating associated switches of the power conversion circuit of the DC/DC converter as shown in FIG. 2A. FIG. 2C is a schematic circuit diagram illustrating the AC current loops of the power conversion circuit of the DC/DC converter as shown in FIG. 2A in the time interval between the time point t0 and the time point t1. FIG. 2D is a schematic circuit diagram illustrating the AC current loops of the power conversion circuit of the DC/DC converter as shown in FIG. 2A in the time interval between the time point t2 and the time point t3.

In this embodiment, the DC/DC converter 2 is a non-isolated DC/DC converter. The DC/DC converter 2 includes a high-voltage side, a low-voltage side, a high-voltage side capacitor C1, a low-voltage side capacitor C2 and a power conversion circuit 20. The connection relationships between the high-voltage side, the low-voltage side, the high-voltage side capacitor C1 and the low-voltage side capacitor C2 and the operations of these components are similar to those of the DC/DC converter 1 as shown in FIG. 1, and not redundantly described herein.

In this embodiment, the power conversion circuit 20 has a symmetric circuitry structure. The power conversion circuit 20 includes a first flying capacitor Cr1, a second flying capacitor Cr2, a first switch group, a second switch group and a magnetic assembly 23. The first switch group includes a first switch S1A, a second switch S2B and a third switch S2C. The second switch group includes a fourth switch S2A, a fifth switch S1B and a sixth switch S1C. The first terminal of the first switch S1A is electrically connected with the high-voltage positive terminal V1+. The second terminal of the first switch S1A is electrically connected with the first terminal of the fifth switch S1B. The second terminal of the fifth switch S1B is electrically connected with the first terminal of the sixth switch S1C. The second terminal of the sixth switch S1C is electrically connected with the high-voltage negative terminal V1−. The first terminal of the fourth switch S2A is electrically connected with the high-voltage positive terminal V1+ and the first terminal of the first switch S1A. The second terminal of the fourth switch S2A is electrically connected with the first terminal of the second switch S2B. The second terminal of the second switch S2B is electrically connected with the first terminal of the third switch S2C. The second terminal of the third switch S2C is electrically connected with the high-voltage negative terminal V1−. The first terminal of the first flying capacitor Cr1 is electrically connected with the second terminal of the first switch S1A. The second terminal of the first flying capacitor Cr1 is electrically connected with the second terminal of the second switch S2B and the first terminal of the third switch S2C. The first terminal of the second flying capacitor Cr2 is electrically connected with the second terminal of the fourth switch S2A. The second terminal of the second flying capacitor Cr2 is electrically connected with the second terminal of the fifth switch S1B and the first terminal of the sixth switch S1C. Moreover, the first switch S1A, the second switch S2B, the third switch S2C, the fourth switch S2A, the fifth switch S1B and the sixth switch S1C are periodically operated in a switching cycle.

In an embodiment, the magnetic assembly 23 includes a transformer and two inductors Lr1, Lr2 (hereinafter also referring to as first inductor Lr1 and second inductor Lr2). The transformer includes two windings T21 and T22 (also referring to as first winding T21 and second winding T22). In an embodiment, the inductors Lr1 and Lr2 may be configured to derive from the leakage inductances of the transformer and/or the parasitic inductances in traces. Alternatively, the inductors Lr1 and Lr2 are additional inductors independent from the transformer. As shown in FIG. 2A, the second terminals of the two windings T21 and T22 are opposite-polarity terminals. Moreover, the second terminals of the two windings T21 and T22 are electrically connected with the low-voltage positive terminal V2+. The first terminal of the winding T21 is electrically connected with the first terminal of the inductor Lr1. The first terminal of the winding T22 is electrically connected with the first terminal of the inductor Lr2. The second terminal of the inductor Lr1 is electrically connected with the second terminal of the second switch S2B and the first terminal of the third switch S2C. The second terminal of the inductor Lr2 is electrically connected with the second terminal of the fifth switch S1B and the first terminal of the sixth switch S1C. It is noted that the constituents of the magnetic assembly 23 are not restricted. For example, in another embodiment, the magnetic assembly includes two inductors Lr1 and Lr2 only.

In addition, the conducting states and the non-conducting states of the first switch S1A, the second switch S2B and the sixth switch S1C are identical. The conducting states and the non-conducting states of the fourth switch S2A, the fifth switch S1B and the third switch S2C are identical. As shown in FIG. 2B, the time interval between the time point t0 and the time point t4 is defined as one switching cycle. In the time interval between the time point t0 and the time point t1, the first switch S1A, the second switch S2B and the sixth switch S1C are in the conducting state, and the fourth switch S2A, the fifth switch S1B and the third switch S2C are in the non-conducting state. In the time interval between the time point t2 and the time point t3, the first switch S1A, the second switch S2B and the sixth switch S1C are in the non-conducting state, and the fourth switch S2A, the fifth switch S1B and the third switch S2C are in the conducting state. The time interval between the time point t1 and the time point t2 is a dead time. The time interval between the time point t3 and the time point t4 is also a dead time. The phase difference between the control signals for controlling the first switch S1A and the fourth switch S2A is 180 degrees. The conducting period of the first switch S1A and the conducting period of the fourth switch S2A are shorter than or equal to 0.5×Ts and greater than or equal to 0.4×Ts, wherein Ts is the switching cycle of the power conversion circuit 20. If the dead time is not taken into consideration, the duty cycle of each switch is approximately close to 50%.

Referring to FIG. 2C, in the time interval between the time point t0 and the time point t1, the first switch S1A, the second switch S2B and the sixth switch S1C are in the conducting state, the DC/DC converter 2 includes three AC current loops. The first AC current loop (labelled as letter A in FIG. 2C) is defined by the high-voltage side capacitor C1, the first switch S1A, the first flying capacitor Cr1, the inductor Lr1 and the winding T21 collaboratively. The second AC current loop (labelled as letter B in FIG. 2C) is defined by the sixth switch S1C, the second flying capacitor Cr2, the second switch S2B, the inductor Lr1, the winding T21 and the low-voltage side capacitor C2 collaboratively. The third AC current loop (labelled as letter C in FIG. 2C) is defined by the sixth switch S1C, the inductor Lr2, the winding T22 and the low-voltage side capacitor C2 collaboratively.

Referring to FIG. 2D, in the time interval between the time point t2 and the time point t3, the fourth switch S2A, the fifth switch S1B and the third switch S2C are in the conducting state, the DC/DC converter 2 also includes three AC current loops. The first AC current loop (labelled as letter D in FIG. 2D) is defined by the high-voltage side capacitor C1, the fourth switch S2A, the second flying capacitor Cr2, the inductor Lr2 and the winding T22 collaboratively. The second AC current loop (labelled as letter E in FIG. 2D) is defined by the third switch S2C, the first flying capacitor Cr1, the fifth switch S1B, the inductor Lr2, the winding T22 and the low-voltage side capacitor C2 collaboratively. The third AC current loop (labelled as letter F in FIG. 2D) is defined by the third switch S2C, the inductor Lr1, the winding T21 and the low-voltage side capacitor C2 collaboratively.

As previously described, the AC current in at least one of the plurality of AC current loop of the conventional DC/DC converter flows through both the high-voltage side capacitor and low-voltage side capacitor. From the AC current loops in FIG. 2C and FIG. 2D, firstly, the first terminal of the high-voltage side capacitor C1 is electrically connected with the high-voltage positive terminal V1+, and the second terminal of the high-voltage side capacitor C1 is electrically connected with the low-voltage positive terminal V2+. Consequently, in all time intervals, the AC current in the first current loop only flows through the high-voltage side capacitor C1 and does not flow through the low-voltage side capacitor C2. Since the AC current flowing into the low-voltage side capacitor C2 is decreased, the power loss caused by the parasitic resistance on the low-voltage side capacitor C2 is decreased. In addition, the AC current in other AC current loops do not flow through both the high-voltage side capacitor C1 and the low-voltage side capacitor C2. Consequently, the parasitic resistance in the AC current loop is decreased, and the power loss of the DC/DC converter 2 is decreased. As previously described, the voltage across the two terminals of the high-voltage side capacitor of the conventional DC/DC converter is equal to the input voltage. In contrast, the voltage across the two terminals of the high-voltage side capacitor C1 in the DC/DC converter 2 of the present disclosure is equal to the difference between the input voltage Vin and the output voltage Vo. Consequently, the DC voltage offset of the high-voltage side capacitor C1 is decreased. Under this circumstance, the capacitor with a higher equivalent capacitance can be selected as the high-voltage side capacitor C1.

As mentioned above, in the time interval between the time point t0 and the time point t1, the first switch S1A, the second switch S2B and the sixth switch S1C are in the conducting state. The first AC current loop includes the high-voltage side capacitor C1, the first flying capacitor Cr1 and the inductor Lr1, and further includes an equivalent capacitor and an equivalent inductor. The equivalent capacitor is defined by the low-voltage side capacitor C2 equivalent to the first side of the transformer (i.e., the side corresponding to the inductor Lr1 and the winding T21). The equivalent inductor is defined by the inductor Lr2 equivalent to the first side of the transformer (i.e., the side corresponding to the inductor Lr1 and the winding T21). The second AC current loop includes the second flying capacitor Cr2, the inductor Lr1 and the low-voltage side capacitor C2, and further includes the equivalent capacitor and the equivalent inductor. The equivalent capacitor is defined by the low-voltage side capacitor C2 equivalent to the first side of the transformer. The equivalent inductor is defined by the inductor Lr2 equivalent to the first side of the transformer.

Similarly, in the time interval between the time point t2 and the time point t3, the fourth switch S2A, the fifth switch S1B and the third switch S2C are in the conducting state. The first AC current loop includes the high-voltage side capacitor C1, the second flying capacitor Cr2 and the inductor Lr2, and further includes an equivalent capacitor and an equivalent inductor. The equivalent capacitor is defined by the low-voltage side capacitor C2 equivalent to the second side of the transformer (i.e., the side corresponding to the inductor Lr2 and the winding T22). The equivalent inductor is defined by the inductor Lr1 equivalent to the second side of the transformer (i.e., the side corresponding to the inductor Lr2 and the winding T22). The second AC current loop includes the first flying capacitor Cr1, the inductor Lr2 and the low-voltage side capacitor C2, and further includes the equivalent capacitor and the equivalent inductor. The equivalent capacitor is defined by the low-voltage side capacitor C2 equivalent to the first side of the transformer (i.e., the side corresponding to the inductor Lr1 and the winding T21). The equivalent inductor is defined by the inductor Lr2 equivalent to the first side of the transformer (i.e., the side corresponding to the inductor Lr1 and the winding T21).

Regardless of the situation in FIG. 2C or the situation in FIG. 2D, the resonance frequency in the first AC current loop can be simplified as: $1/(2\times\pi\times\mathrm{sqrt}((Cr1//(C2/3)//C1)\times(2\times Lr)))$, and the resonance frequency in the second AC current loop can be simplified as: $1/(2\times\pi\times\mathrm{sqrt}((Cr1//(C2/3)//(C2/3))\times(2\times Lr)))$. In case that the capacitance of the high-voltage side capacitor C1 is one third of the capacitance of the low-voltage side capacitor C2 (i.e., $C1=C2\times\frac{1}{3}$), the equivalent capacitance in the first AC current loop and the equivalent capacitance in the second AC current loop are equal. Since the resonance frequencies of the two AC current loops are equal, the currents flowing through the two AC current loops can achieve the sinusoidal waveform at the same time, and the switches in the two AC current loops can achieve the zero-current switching function.

Figure 3:
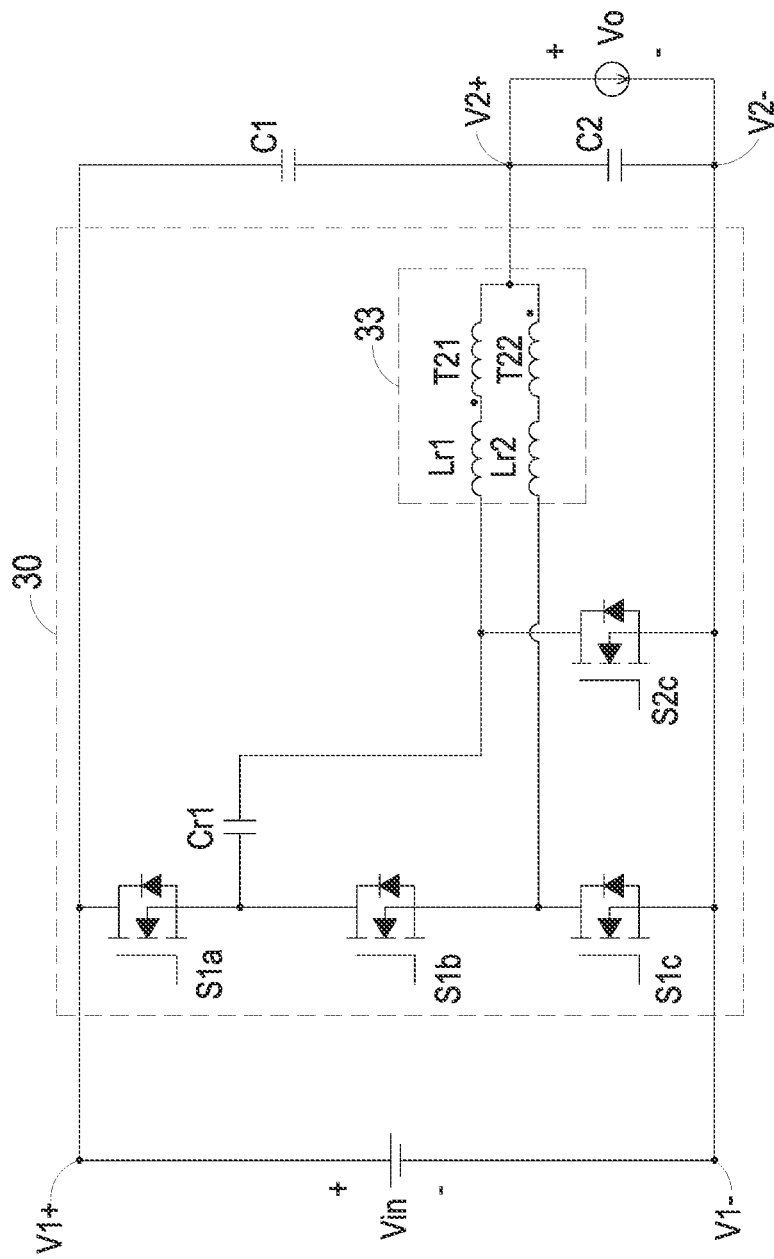
FIG. 3 is a circuit structure of a DC/DC converter according to a second embodiment of the present disclosure.

FIG. 3 is a circuit structure of a DC/DC converter according to a second embodiment of the present disclosure. In this embodiment, the DC/DC converter 2a is a non-isolated DC/DC converter. In addition, the power conversion circuit 30 of the DC/DC converter has an asymmetric circuitry structure. The power conversion circuit 30 includes a first switch group, a second switch group, a first flying capacitor Cr1 and a magnetic assembly 33.

The first switch group includes a first switch S1a and a third switch S2c connected in series. The second switch group includes a second switch S1b and a fourth switch S1c connected in series. Moreover, the first switch S1a, the second switch S1b, the third switch S2c and the fourth switch S1c are periodically operated in a switching cycle. The first terminal of the first switch S1a is electrically connected with the high-voltage positive terminal V1+. The second terminal of the first switch S1a is electrically connected with the first terminal of the second switch S1b. The second terminal of the second switch S1b is electrically connected with the first terminal of the fourth switch S1c. The second terminal of the third switch S2c and the second terminal of the fourth switch S1c are electrically connected with each other and electrically connected with the high-voltage negative terminal V1−. The first terminal of the first flying capacitor Cr1 is electrically connected with the second terminal of the first switch S1a. The second terminal of the first flying capacitor Cr1 is electrically connected with the first terminal of the third switch S2c. In this embodiment, the magnetic assembly 33 includes a transformer and two inductors Lr1, Lr2, and the transformer includes two windings T21 and T22. It is noted that the constituents of the magnetic assembly 23 are not restricted. For example, in another embodiment, the magnetic assembly 33 includes two inductors Lr1 and Lr2 only.

The conducting states and the non-conducting states of the first switch S1a and the fourth switch S1c are identical. The conducting states and the non-conducting states of the second switch S1b and the third switch S2c are identical. The phase difference between the control signal for controlling the first switch S1a and the control signal for controlling the second switch S1b is 180 degrees. The conducting period of the first switch S1a and the conducting period of the second switch S1b are shorter than or equal to 0.5×Ts and greater than or equal to 0.4×Ts, wherein Ts is the switching cycle of the power conversion circuit 30.

Similar to the magnetic assembly 23, the magnetic assembly 33 includes a transformer and two inductors Lr1, Lr2. The transformer includes two windings T21 and T22. In an embodiment, the inductors Lr1 and Lr2 may be configured to derive from the leakage inductances of the transformer and/or the parasitic inductances in traces. Alternatively, the inductors Lr1 and Lr2 are additional inductors independent from the transformer. As shown in FIG. 3, the second terminals of the two windings T21 and T22 are opposite-polarity terminals. Moreover, the second terminals of the two windings T21 and T22 are electrically connected with the low-voltage positive terminal V2+. The first terminal of the winding T21 is electrically connected with the first terminal of the inductor Lr1. The first terminal of the winding T22 is electrically connected with the first terminal of the inductor Lr2. The second terminal of the inductor Lr1 is electrically connected with the first terminal of the third switch S2c. The second terminal of the inductor Lr2 is electrically connected with the second terminal of the second switch S1b and the first terminal of the fourth switch S1c.

The performance of the DC/DC converter 2a of this embodiment is similar to the performance of the DC/DC converter 2 of the first embodiment. Similarly, the first terminal of the high-voltage side capacitor C1 is electrically connected with the high-voltage positive terminal V1+, and the second terminal of the high-voltage side capacitor C1 is electrically connected with the low-voltage positive terminal V2+. Consequently, in each conducting-state time duration, the AC current in each AC current loop only flows through one of the high-voltage side capacitor C1 and the low-voltage side capacitor C2. Since the AC current in the AC current loop flows through reduced number of capacitors and the path of the AC current loop is shortened, the power loss caused by the parasitic resistance is decreased. Moreover, since the DC voltage offset of the high-voltage side capacitor C1 is decreased, the equivalent capacitance of the high-voltage side capacitor C1 is increased. Similarly, the voltage ripple at the high-voltage side is filtered off by the series-connected high-voltage side capacitor C1 and low-voltage side capacitor C2, and the voltage ripple at the low-voltage side is filtered off by the low-voltage side capacitor C2.

Figure 4:
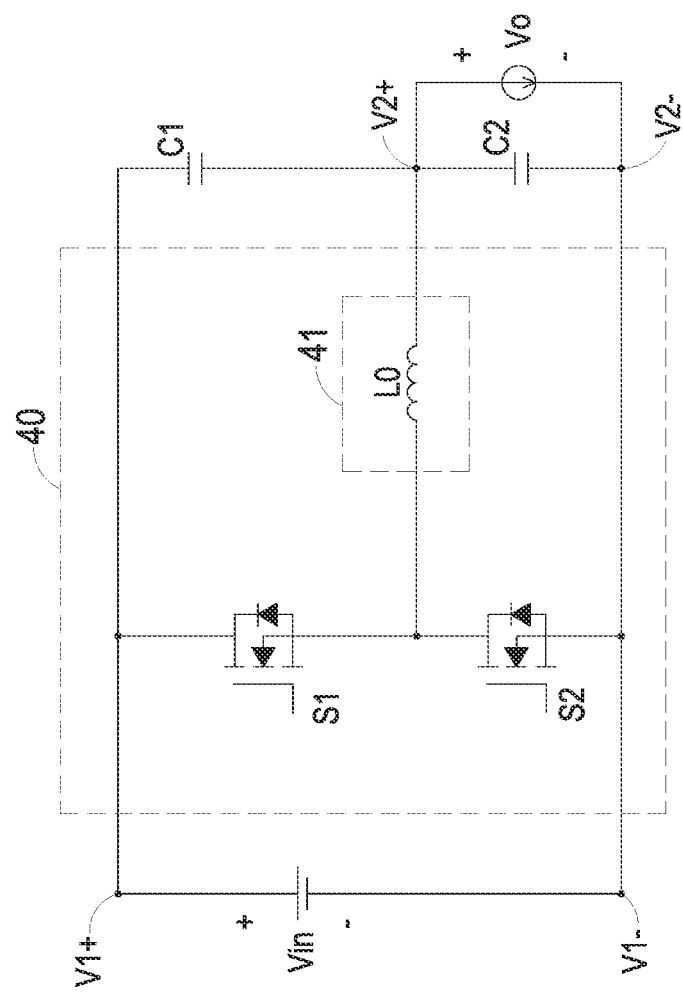
FIG. 4 is a circuit structure of a DC/DC converter according to a third embodiment of the present disclosure.

FIG. 4 is a circuit structure of a DC/DC converter according to a third embodiment of the present disclosure. In this embodiment, the DC/DC converter 2b is a non-isolated DC/DC converter. Moreover, the power conversion circuit 40 of the DC/DC converter 2b has a hard-switch type buck circuitry structure. In this embodiment, the conversion circuit 40 includes a first switch group, a second switch group and a magnetic assembly 41. The first switch group includes a first switch S1. The second switch group includes a second switch S2. The first terminal of the first switch S1 is electrically connected with the high-voltage positive terminal V1+. The second terminal of the first switch S1 is electrically connected with the first terminal of the second switch S2. The second terminal of the second switch S2 is electrically connected with the high-voltage negative terminal V1−. The magnetic assembly 41 includes an inductor LO. The first terminal of the inductor LO is electrically connected between the second terminal of the first switch S1 and the first terminal of the second switch S2. The second terminal of the inductor LO is electrically connected with the low-voltage positive terminal V2+.

In this embodiment, the DC/DC converter 2b includes two AC current loops. The first AC current loop is defined by the inductor LO and the high-voltage side capacitor C1 collaboratively. The second AC current loop is defined by the inductor LO and the low-voltage side capacitor C2 collaboratively. The performance of the DC/DC converter 2b of this embodiment is similar to the performance of the DC/DC converter 2 of the first embodiment. Similarly, the first terminal of the high-voltage side capacitor C1 is electrically connected with the high-voltage positive terminal V1+, and the second terminal of the high-voltage side capacitor C1 is electrically connected with the low-voltage positive terminal V2+. Consequently, in each conducting-state time duration, the AC current in each AC current loop only flows through one of the high-voltage side capacitor C1 and the low-voltage side capacitor C2. Since the AC current in the AC current loop flows through reduced number of capacitors and the path of the AC current loop is shortened, the power loss caused by the parasitic resistance is decreased. Moreover, since the DC voltage offset of the high-voltage side capacitor C1 is decreased, the equivalent capacitance of the high-voltage side capacitor C1 is increased. Similarly, the voltage ripple at the high-voltage side is filtered off by the series-connected high-voltage side capacitor C1 and low-voltage side capacitor C2, and the voltage ripple at the low-voltage side is filtered off by the low-voltage side capacitor C2.

Figure 5:
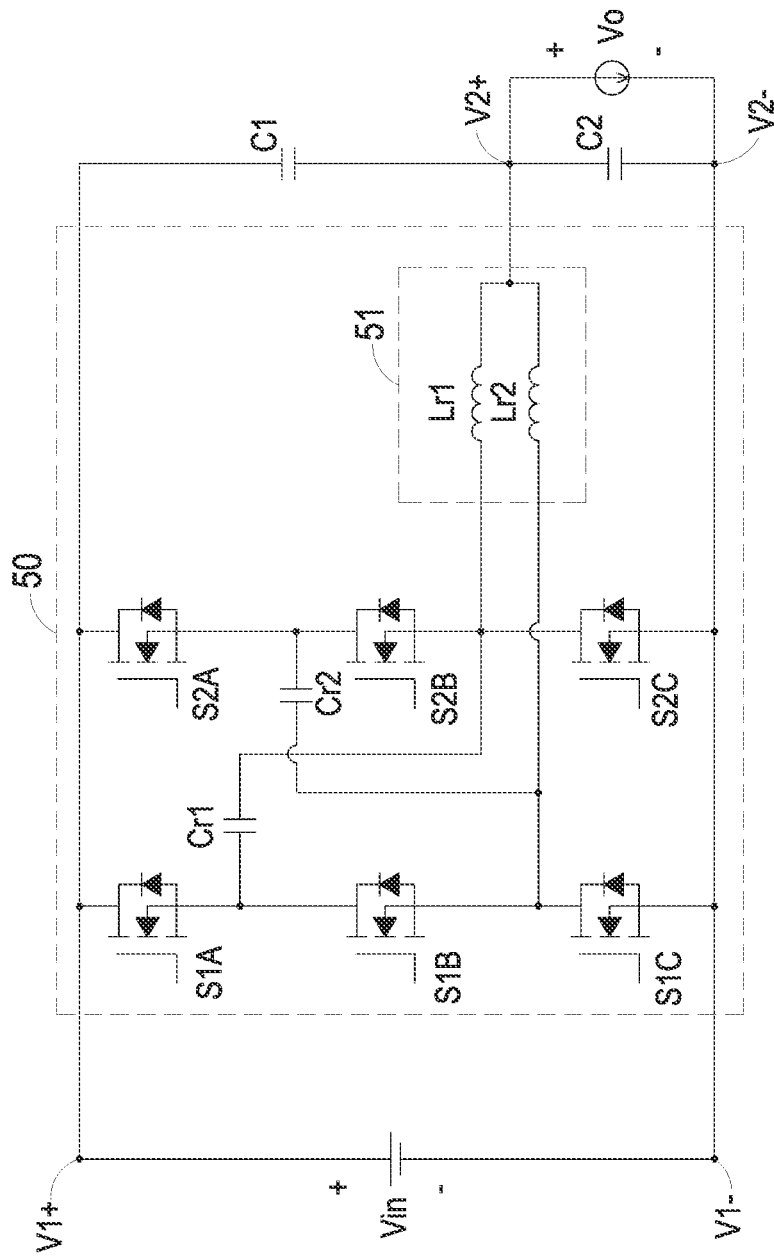
FIG. 5 is a circuit structure of a DC/DC converter according to a fourth embodiment of the present disclosure.

FIG. 5 is a circuit structure of a DC/DC converter according to a fourth embodiment of the present disclosure. In this embodiment, the DC/DC converter 2c is a non-isolated DC/DC converter. Moreover, the power conversion circuit 50 of the DC/DC converter 2c has a symmetrical, hard-switch type buck circuitry structure with an extensible duty cycle. Component parts and elements corresponding to those of FIG. 2A are designated by identical numeral references, and detailed descriptions thereof are omitted. In comparison with the DC/DC converter of FIG. 2A, the magnetic assembly 51 of the DC/DC converter 2c in this embodiment only includes two inductors Lr1 and Lr2. Consequently, the first terminal of the inductor Lr1 and the first terminal of the inductor Lr2 are electrically connected with the low-voltage positive terminal V2+. In some embodiments, the inductor Lr1 and the inductor Lr2 can be formed as a coupled inductor.

When the first switch S1A, the second switch S2B and the sixth switch S1C are in the conducting state, the DC/DC converter 2c includes three AC current loops. The first AC loop is defined by the high-voltage side capacitor C1, the first switch S1A, the first flying capacitor Cr1 and the inductor Lr1 collaboratively. The second AC loop is defined by the sixth switch S1C, the second flying capacitor Cr2, the second switch S2B, the inductor Lr1 and the low-voltage side capacitor C2 collaboratively. The third AC loop is defined by the sixth switch S1C, the inductor Lr2 and the low-voltage side capacitor C2 collaboratively. When the fourth switch S2A, the fifth switch S1B and the third switch S2C are in the conducting state, the DC/DC converter 2c also includes three AC current loops. The first AC loop is defined by the high-voltage side capacitor C1, the fourth switch S2A, the second flying capacitor Cr2 and the inductor Lr2 collaboratively. The second AC loop is defined by the third switch S2C, the first flying capacitor Cr1, the fifth switch S1B, the transformer winding T22 and the low-voltage side capacitor C2 collaboratively. The third AC loop is defined by the third switch S2C, the inductor Lr1 and the low-voltage side capacitor C2 collaboratively.

The performance of the DC/DC converter 2c of this embodiment is similar to the performance of the DC/DC converter 2 of the first embodiment. Similarly, the first terminal of the high-voltage side capacitor C1 is electrically connected with the high-voltage positive terminal V1+, and the second terminal of the high-voltage side capacitor C1 is electrically connected with the low-voltage positive terminal V2+. Consequently, in each conducting-state time duration, the AC current in each AC current loop only flows through one of the high-voltage side capacitor C1 and the low-voltage side capacitor C2. Since the AC current in the AC current loop flows through reduced number of capacitors and the path of the AC current loop is shortened, the power loss caused by the parasitic resistance is decreased. Moreover, since the DC voltage offset of the high-voltage side capacitor C1 is decreased, the equivalent capacitance of the high-voltage side capacitor C1 is increased. Similarly, the voltage ripple at the high-voltage side is filtered off by the series-connected high-voltage side capacitor C1 and low-voltage side capacitor C2, and the voltage ripple at the low-voltage side is filtered off by the low-voltage side capacitor C2.

Referring to FIG. 2A, FIG. 3, FIG. 4 and FIG. 5, in the above embodiments, the high-voltage side is configured as the input side, and the low-voltage side is configured as the output side. It is noted that the input side and the output side may be interchangeable. That is, in some other embodiments, the low-voltage side is configured as the input side, and the high-voltage side is configured as the output side. The first terminal of the high-voltage side capacitor C1 is electrically connected with the high-voltage positive terminal V1+. The second terminal of the high-voltage side capacitor C1 is electrically connected with the low-voltage positive terminal V2+. Similarly, the power loss of the DC/DC converter is reduced, and the DC voltage offset of the high-voltage side capacitor C1 is reduced, and the equivalent capacitance of the high-voltage side capacitor C1 is increased.

From the above descriptions, the present disclosure provides the DC/DC converter. The first terminal of the high-voltage side capacitor is electrically connected with the high-voltage positive terminal of the high-voltage side. The second terminal of the high-voltage side capacitor is electrically connected with the low-voltage positive terminal of the low-voltage side. Consequently, the paths of the plurality of AC current loops in DC/DC converter are changed. In this way, the AC current in each AC current loop only flows through one of the high-voltage side capacitor and the low-voltage side capacitor. Since the AC current in the AC current loop flows through reduced number of capacitors and the path of the AC current loop is shortened, the power loss caused by the parasitic resistance is decreased. In accordance with the present disclosure, the DC voltage across the two terminals of the high-voltage side capacitor of the DC/DC converter is equal to the difference between the input voltage and the output voltage. Consequently, the DC voltage offset of the high-voltage side capacitor is decreased, and the equivalent capacitance of the high-voltage side capacitor is increased. Moreover, the voltage ripple at the high-voltage side is filtered off by the series-connected high-voltage side capacitor and low-voltage side capacitor, and the voltage ripple at the low-voltage side is filtered off by the low-voltage side capacitor.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A DC/DC converter, comprising:
   a first end comprising a high-voltage positive terminal and a high-voltage negative terminal;
   a second end comprising a low-voltage positive terminal and a low-voltage negative terminal, wherein the low-voltage negative terminal is electrically connected with the high-voltage negative terminal;
   a first capacitor, wherein a first terminal of the first capacitor is electrically connected with the high-voltage positive terminal, and a second terminal of the first capacitor is electrically connected with the low-voltage positive terminal;
   a power conversion circuit, disposed between the first end and the second end and providing a conversion between a high voltage at the first end and a low voltage at the second end, wherein the power conversion circuit comprises at least one switch and at least one magnetic assembly; and
   a second capacitor;
   wherein a first terminal of the second capacitor is electrically connected with the low-voltage positive terminal, a second terminal of the second capacitor is electrically connected with the low-voltage negative terminal, and second capacitor is configured to filter a voltage ripple at the second end,
   wherein the first capacitor and the second capacitor are electrically connected in series and configured to filter a voltage ripple at the first end.

2. The DC/DC converter according to claim 1, wherein a capacitance of the first capacitor is substantially one third of a capacitance of the second capacitor.

3. The DC/DC converter according to claim 1, wherein the power conversion circuit further comprises a first switch group and a second switch group,
   wherein the first switch group is electrically connected with the high-voltage positive terminal and the high-voltage negative terminal, and the second switch group is electrically connected with the high-voltage positive terminal and the high-voltage negative terminal, and each of the first switch group and the second switch group comprise the at least one switch.

4. The DC/DC converter according to claim 3, wherein the at least one magnetic assembly comprises a first inductor, a second inductor and a transformer including a first winding and a second winding,
   wherein a second terminal of the first winding and a second terminal of the second winding are opposite-polarity terminals, and the second terminal of the first winding and the second terminal of the second winding are electrically connected with the low-voltage positive terminal,
   wherein a first terminal of the first winding is electrically connected with a first terminal of the first inductor, and a first terminal of the second winding is electrically connected with a first terminal of the second inductor, and a second terminal of the first inductor and a second terminal of the second inductor are electrically connected with the first switch group and the second switch group.

5. The DC/DC converter according to claim 4, wherein the first inductor and the second inductor are configured to derive from the leakage inductance of the transformer and/or the parasitic inductance in the circuit.

6. The DC/DC converter according to claim 4, wherein the first inductor and the second inductor are additional inductors independent from the transformer.

7. The DC/DC converter according to claim 3, wherein the at least one magnetic assembly comprises an inductor, wherein a first terminal of the inductor is electrically connected with the first switch group and the second switch group, and a second terminal of the inductor is electrically connected with the low-voltage positive terminal.

8. The DC/DC converter according to claim 3, wherein the at least one magnetic assembly comprises a first inductor and a second inductor,
   wherein a first terminal of the first inductor and a first terminal of the second inductor are electrically connected with the low-voltage positive terminal, and a second terminal of the first inductor and a second terminal of the second inductor are electrically connected with the first switch group and the second switch group.

9. The DC/DC converter according to claim 8, wherein the first inductor and the second inductor of the at least one magnetic assembly are electrically coupled with each other to form a coupled inductor.

10. The DC/DC converter according to claim 4, wherein the power conversion circuit further comprises a first flying capacitor and a second flying capacitor,
wherein the first switch group includes a first switch, a second switch and a third switch, wherein a first terminal of the first switch is electrically connected with the high-voltage positive terminal, a second terminal of the second switch is electrically connected with a first terminal of the third switch, and a second terminal of the third switch is electrically connected with the high-voltage negative terminal,
wherein the second switch group includes a fourth switch, a fifth switch and a sixth switch, wherein a first terminal of the fourth switch is electrically connected with the high-voltage positive terminal, and a second terminal of the fourth switch is electrically connected with a first terminal of the second switch, and a first terminal of the fifth switch is electrically connected with a second terminal of the first switch, and a second terminal of the fifth switch is electrically connected with a first terminal of the sixth switch, and a second terminal of the sixth switch is electrically connected with the high-voltage negative terminal, wherein the first switch, the second switch, the third switch, the fourth switch, the fifth switch and the sixth switch are periodically operated in a switching cycle,
wherein a first terminal of the first flying capacitor is electrically connected with the second terminal of the first switch, and a second terminal of the first flying capacitor is electrically connected with the second terminal of the second switch and the first terminal of the third switch,
wherein a first terminal of the second flying capacitor is electrically connected with the second terminal of the fourth switch, and a second terminal of the second flying capacitor is electrically connected with the second terminal of the fifth switch and the first terminal of the sixth switch,
wherein the second terminal of the first inductor is electrically connected with the second terminal of the second switch and the first terminal of the third switch, and the second terminal of the second inductor is electrically connected with the second terminal of the fifth switch and the first terminal of the sixth switch.

11. The DC/DC converter according to claim 10, wherein the first switch, the second switch and the sixth switch have the consistent conducting state and consistent non-conducting state, and the fourth switch, the fifth switch and the third switch have the consistent conducting state and consistent non-conducting state, and a control signal for controlling the first switch has a 180-degree phase difference with respect to a control signal for controlling the fourth switch.

12. The DC/DC converter according to claim 11, wherein a conducting period of the first switch and a conducting period of the fourth switch are within the range of 0.4 Ts to 0.5 Ts, wherein Ts represents the switching cycle of the power conversion circuit.

13. The DC/DC converter according to claim 4, wherein the power conversion circuit further comprises a flying capacitor,
wherein the first switch group includes a first switch and a third switch electrically connected in series,
wherein the second switch group includes a second switch and a fourth switch electrically connected in series, wherein a first terminal of the first switch is electrically connected with the high-voltage positive terminal, a second terminal of the first switch is electrically connected with a first terminal of the second switch, a second terminal of the second switch is electrically connected with a first terminal of the fourth switch, and a second terminal of the third switch and a second terminal of the fourth switch are electrically connected with the high-voltage negative terminal, wherein the first switch, the second switch, the third switch and the fourth switch are periodically operated in a switching cycle,
wherein a first terminal of the flying capacitor is electrically connected with the second terminal of the first switch, and a second terminal of the flying capacitor is electrically connected with a first terminal of the third switch,
wherein the second terminal of the first inductor is electrically connected with the first terminal of the third switch, and the second terminal of the second inductor is electrically connected with the second terminal of the second switch and the first terminal of the fourth switch.

14. The DC/DC converter according to claim 13, wherein the first switch and the fourth switch have the consistent conducting state and consistent non-conducting state, and the second switch and the third switch have the consistent conducting state and consistent non-conducting state, and a control signal for controlling the first switch has a 180-degree phase difference with respect to a control signal for controlling the second switch.

15. The DC/DC converter according to claim 14, wherein a conducting period of the first switch and a conducting period of the second switch are within the range of 0.4 Ts to 0.5 Ts, wherein Ts represents the switching cycle of the power conversion circuit.

16. The DC/DC converter according to claim 7, wherein the first switch group includes a first switch, and a first terminal of the first switch is electrically connected with the high-voltage positive terminal,
wherein the second switch group includes a second switch, and a second terminal of the first switch is electrically connected with a first terminal of the second switch, and a second terminal of the second switch is electrically connected with the high-voltage negative terminal,
wherein a first terminal of the inductor is electrically connected with the second terminal of the first switch and the first terminal of the second switch, and a second terminal of the inductor is electrically connected with the low-voltage positive terminal.

17. The DC/DC converter according to claim 8, wherein the power conversion circuit further comprises a first flying capacitor and a second flying capacitor,
wherein the first switch group includes a first switch, a second switch and a third switch, wherein a first terminal of the first switch is electrically connected with the high-voltage positive terminal, a second terminal of the second switch is electrically connected with a first terminal of the third switch, and a second terminal of the third switch is electrically connected with the high-voltage negative terminal,
wherein the second switch group includes a fourth switch, a fifth switch and a sixth switch, wherein a first terminal of the fourth switch is electrically connected with the high-voltage positive terminal, a second terminal of the fourth switch is electrically connected with a first terminal of the second switch, a first terminal of the fifth switch is electrically connected with a second terminal of the first switch, a second terminal of the fifth switch is electrically connected with a first terminal of the sixth switch, and a second terminal of the sixth switch is electrically connected with the high-voltage negative terminal, wherein the first switch, the second switch, the third switch, the fourth switch, the fifth switch and the sixth switch are periodically operated in a switching cycle, wherein a first terminal of the first flying capacitor is electrically connected with the second terminal of the first switch, and a second terminal of the first flying capacitor is electrically connected with the second terminal of the second switch and the first terminal of the third switch, wherein a first terminal of the second flying capacitor is electrically connected with the second terminal of the fourth switch, and a second terminal of the second flying capacitor is electrically connected with the second terminal of the fifth switch and the first terminal of the sixth switch, wherein the second terminal of the first inductor is electrically connected with the second terminal of the second switch and the first terminal of the third switch, and the second terminal of the second inductor is electrically connected with the second terminal of the fifth switch and the first terminal of the sixth switch.

18. The DC/DC converter according to claim 8, wherein the power conversion circuit further comprises a flying capacitor, wherein the first switch group includes a first switch and a third switch electrically connected in series, wherein the second switch group includes a second switch and a fourth switch electrically connected in series, wherein a first terminal of the first switch is electrically connected with the high-voltage positive terminal, a second terminal of the first switch is electrically connected with a first terminal of the second switch, a second terminal of the second switch is electrically connected with a first terminal of the fourth switch, and a second terminal of the third switch and a second terminal of the fourth switch are electrically connected with the high-voltage negative terminal, wherein the first switch, the second switch, the third switch and the fourth switch are periodically operated in a switching cycle, wherein a first terminal of the flying capacitor is electrically connected with the second terminal of the first switch, and a second terminal of the flying capacitor is electrically connected with a first terminal of the third switch, wherein the second terminal of the first inductor is electrically connected with the first terminal of the third switch, and the second terminal of the second inductor is electrically connected with the second terminal of the second switch and the first terminal of the fourth switch.

* * * * *